US007669423B2

(12) United States Patent
Nakhamkin

(10) Patent No.: US 7,669,423 B2
(45) Date of Patent: Mar. 2, 2010

(54) OPERATING METHOD FOR CAES PLANT USING HUMIDIFIED AIR IN A BOTTOMING CYCLE EXPANDER

(76) Inventor: Michael Nakhamkin, 40 Woodman La., Basking Ridge, NJ (US) 07920

( * ) Notice: Subject to any disclaimer, the term of this patent is extended or adjusted under 35 U.S.C. 154(b) by 0 days.

(21) Appl. No.: 12/320,403

(22) Filed: Jan. 26, 2009

(65) Prior Publication Data

US 2009/0178384 A1 Jul. 16, 2009

Related U.S. Application Data

(60) Continuation-in-part of application No. 12/285,404, filed on Oct. 3, 2008, now Pat. No. 7,614,237, which is a continuation-in-part of application No. 12/216,911, filed on Jul. 11, 2008, now abandoned, which is a continuation of application No. 12/076,689, filed on Mar. 21, 2008, now Pat. No. 7,406,828, which is a division of application No. 11/657,661, filed on Jan. 25, 2007, now abandoned.

(51) Int. Cl.
*F02C 3/30* (2006.01)
*F02C 7/00* (2006.01)

(52) U.S. Cl. .......................................... 60/775; 60/727

(58) Field of Classification Search .............. 60/39.183, 60/39.53, 39.59, 726, 727, 728, 775
See application file for complete search history.

(56) References Cited

U.S. PATENT DOCUMENTS 5,181,376 A 1/1993 Rao
5,379,589 A 1/1995 Cohn et al.
5,495,709 A * 3/1996 Frutschi .................... 60/39.55
6,305,158 B1 * 10/2001 Nakhamkin et al. ........ 60/39.53
2008/0178601 A1 7/2008 Nakhamkin

OTHER PUBLICATIONS

PCT Search Report & Written Opinion dated Aug. 20, 2009 in corresponding PCT Application No. PCT/US2009/048080.

* cited by examiner

*Primary Examiner*—Louis J Casaregola
(74) *Attorney, Agent, or Firm*—Manelli Denison & Selter pllc; Edward J. Stemberger

(57) ABSTRACT

A power generation system includes a combustion turbine assembly (11) having a main compressor (12) receiving ambient inlet air, a main expansion turbine (14), a main combustor (16), and an electric generator (15) for generating electric power. An air storage (18') has a volume for storing compressed air. A source of humidity (23, 34, 42) humidifies the compressed air that exits the air storage and thus provides humidified compressed air. A heat exchanger (24) receives a source of heat and the humidified compressed air so as to heat the humidified compressed air. A air expander (30) expands the heated, humidified compressed air to exhausted atmospheric pressure for producing additional power, and permits a portion of airflow expanded by the air expander to be injected into the combustion turbine assembly for power augmentation. An electric generator (31) is associated with the air expander for producing additional electrical power. The compressed air humidification reduces the compressed air storage volume for the same stored/generated energy.

9 Claims, 4 Drawing Sheets

OPERATING METHOD FOR CAES PLANT USING HUMIDIFIED AIR IN A BOTTOMING CYCLE EXPANDER

This application is a continuation-in-part of U.S. application Ser. No. 12/285,404, filed on Oct. 3, 2008 now U.S. Pat. No. 7,614,237, which is a continuation-in-part of U.S. application Ser. No. 12/216,911 filed on Jul. 11, 2008 now abandoned which is a continuation of U.S. application Ser. No. 12/076,689, filed on Mar. 21, 2008, now U.S. Pat. No. 7,406,828, which is a division of U.S. application Ser. No. 11/657,661, filed on Jan. 25, 2007, now abandoned.

FIELD

The embodiments relate to compressed air energy storage (CAES) power plants and, more particularly, to the reduction of the compressed air storage volume of the CAES plant.

BACKGROUND

Each of U.S. Pat. No. 7,389,644 and U.S. Pat. No. 7,406,828 discloses a CAES power plant wherein the compressed air is stored primarily in an underground storage utilizing salt, aquifer or hard rock geological formations. The locations of large capacity CAES plants are driven by acceptable geological formations for the compressed air storage in vicinity of large electrical grids. Small capacity CAES plants (e.g., 5-25 MW) are used for load management of small wind farms and small distributed generation grids. The multiple locations of small CAES plants are driven by the locations of energy customers who are often in the urban and populated areas. Obviously, these urban areas do not necessarily have good geological formations for compressed air storage. Even if good geological formations are available, the compressed air storage volumes would be very small and building the storage in underground geological formations would be very expensive. Therefore, for small capacity CAES plants, the best alternative is to store the compressed air in an above ground pressure vessels and/or piping. The above ground storage is still very expensive and its cost is directly proportional to its volume.

SUMMARY

There is a need to reduce compressed air storage volume in CAES plants and, more particularly, for small CAES plants that use above ground compressed air storage.

An object of the present invention is to fulfill the need referred to above. In accordance with the principles of an embodiment, this objective is obtained by providing a compressed air energy storage power generation system including a combustion turbine assembly having a main compressor constructed and arranged to receive ambient inlet air, a main expansion turbine operatively associated with the main compressor, a main combustor constructed and arranged to preheat the received compressed air from the main compressor and to feed the main expansion turbine, and an electric generator associated with the main expansion turbine for generating electric power. Air storage has a specific volume for storing compressed air associated with the specific stored energy. A source of humidity humidifies compressed air that exits the air storage and thereby provides humidified compressed air. A heat exchanger is constructed and arranged to receive a source of heat and to receive the humidified compressed air so as to heat the humidified compressed air. An air expander is constructed and arranged to expand the heated, humidified compressed air to exhausted atmospheric pressure for producing additional power, and to permit a portion of airflow expanded by the air expander to be injected, under certain conditions, into the combustion turbine assembly for additional power due to the power augmentation of the combustion turbine. An electric generator, associated with the air expander, produces additional electrical power. Due to the humidification of the compressed air, a volume of the air storage associated with specific stored energy can be reduced, thereby reducing the size and cost of the air storage. Regarding a compressor that supplies the air storage, the compressor size, cost and consumed power is also reduced correspondingly.

In accordance with another aspect of an embodiment, a method is provided to reduce a volume of an air storage in a compressed air energy storage power generation system. The system includes a combustion turbine assembly having a main compressor constructed and arranged to receive ambient inlet air, a main expansion turbine operatively associated with the main compressor, at least one combustor constructed and arranged to preheat the received compressed air from the main compressor and to feed the main expansion turbine, and an electric generator associated with the main expansion turbine for generating electric power. Air storage has a specific volume for storing compressed air associated with the specific stored energy. The method provides humidity to humidify compressed air that exits the air storage and thereby provides humidified compressed air. The humidified compressed air is then heated. The heated, humidified compressed air is expanded in an air expander. Additional electric power is generated by an electric generator using air expanded by the air expander. The air expander is constructed and arranged to permit a portion of airflow expanded by the air expander to be extracted and injected, under certain conditions, into the combustion turbine assembly for additional power by the power augmentation of the combustion turbine Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXAMPLE EMBODIMENTS

Figure 1:
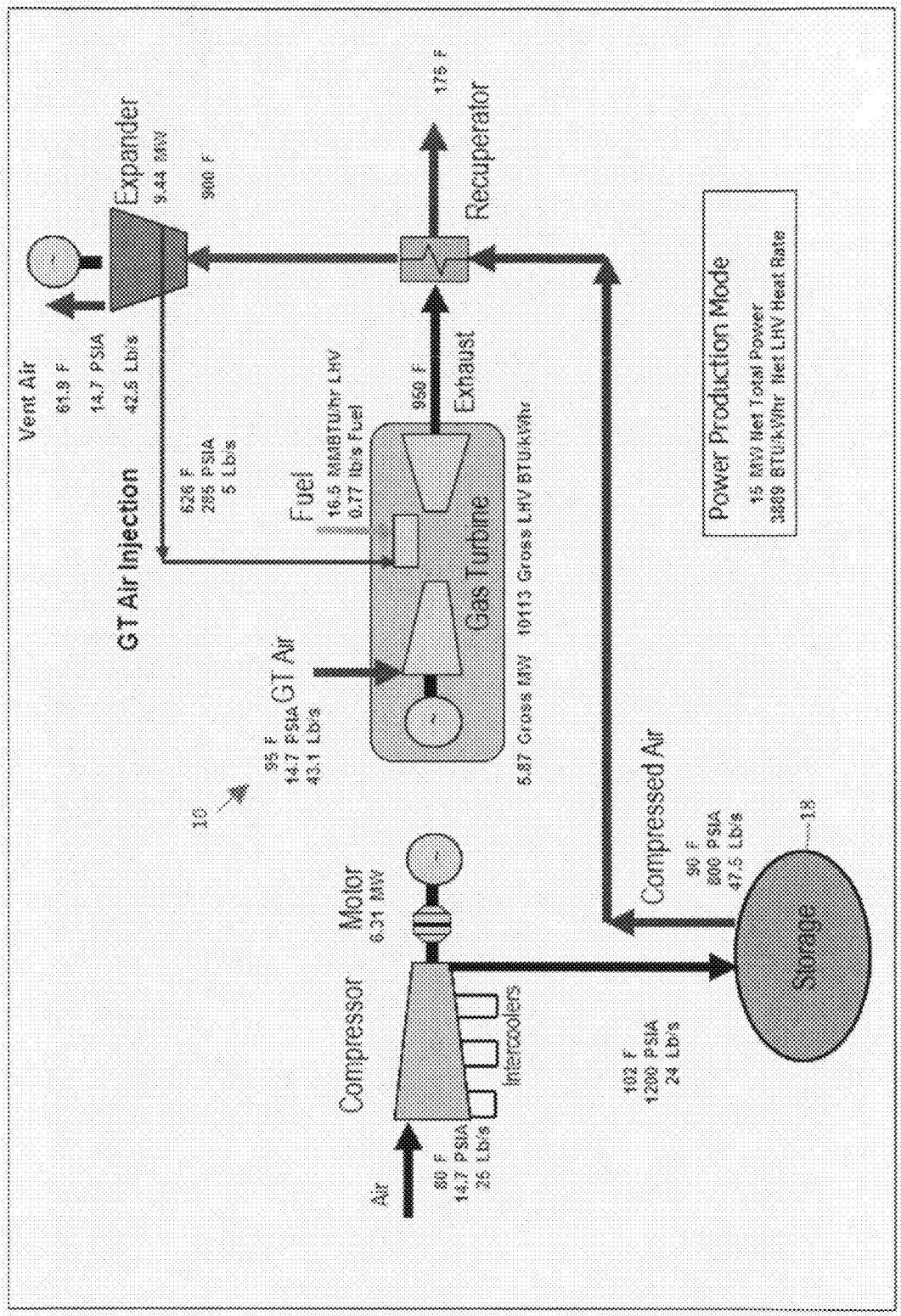
FIG. 1 is a schematic illustration of a CAES power generation system of the type disclosed in U.S. Pat. No. 7,406,828 having a relatively large, underground air storage for storing compressed air.

U.S. Pat. Nos. 7,389,644 and 7,406,828, the contents of which are hereby incorporated by reference into this specification, disclose that in a CAES system, stored compressed air is withdrawn from a compressed air storage, is preheated by utilizing combustion turbine exhaust gas heat, and is then directed into an expander that generates bottoming cycle power in addition to power augmented combustion turbine power. The power generated by bottoming cycle expander, along with other features, is directly proportional to the compressed air flow withdrawn from the storage and to the expander inlet temperature and pressure. The expander compressed air flow and temperature are optimized based on the available exhaust heat of combustion turbine/other heat source. For example, FIG. 1 shows the CAES plant 10 of U.S. Pat. No. 7,406,828 having a withdrawn airflow of 47.5 lbs/sec from the relatively large underground compressed air storage 18, producing the 15.3 MW net total power and the bottoming cycle expander power of 9.44 MW. The approximately 15 MW of the CAES plant net power is selected just for the comparative analysis of patented concepts and new embodiments. The range of the net power is practically unlimited but based on the specific concepts with an above ground compressed air storage, it is anticipated that typical net power will be in the range of 5-25 MW.

Figure 2:
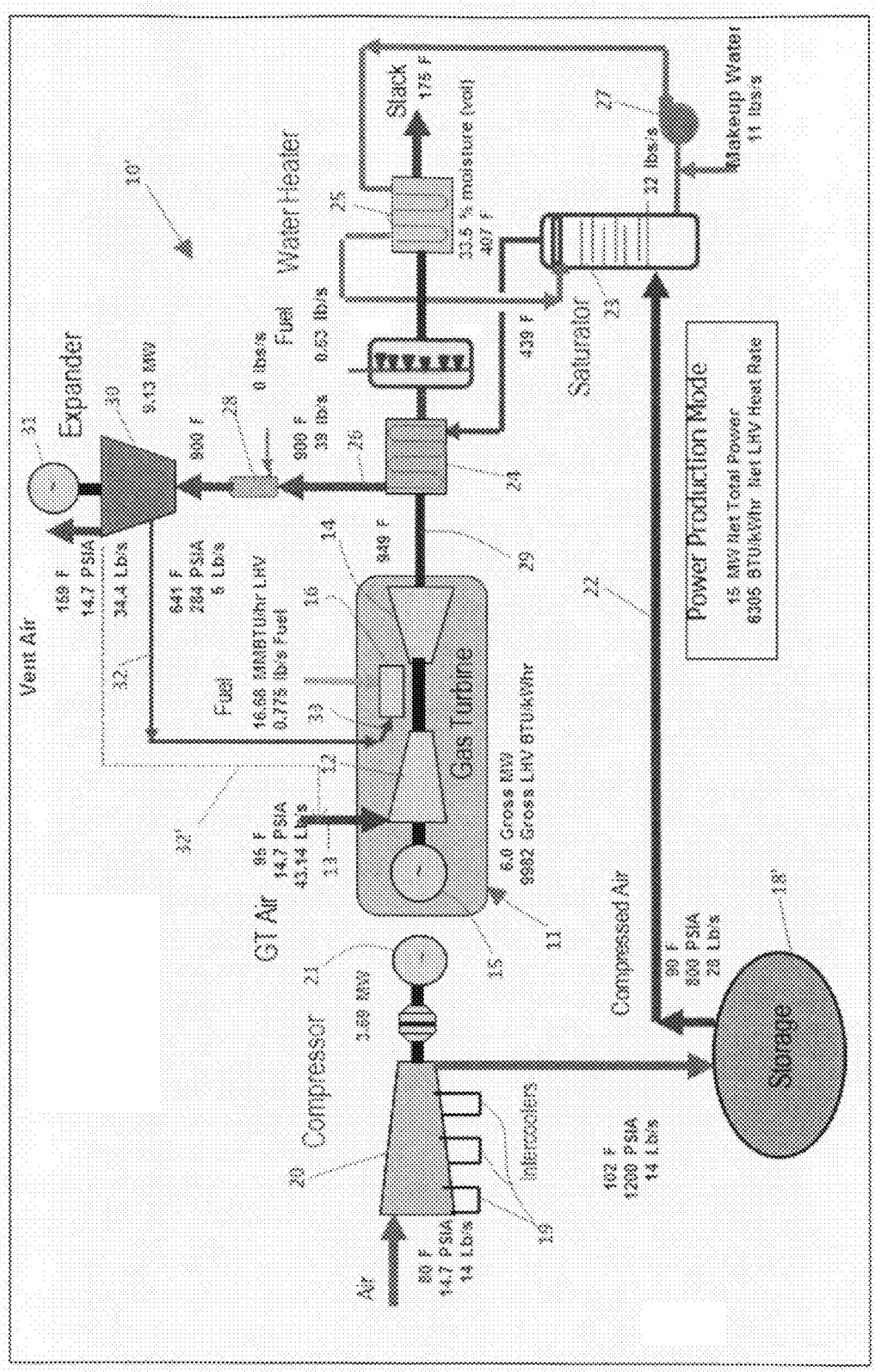
FIG. 2 is a schematic illustration of a CAES power generation system having a saturator as a source of humidity in accordance with an embodiment, so that due to use of humidified compressed air, a volume of the air storage and the size of the compressor for charging the air storage can be reduced.

With reference to FIG. 2, a CAES power generation system with power augmentation, generally indicated as 10', is shown in accordance with an embodiment of the present invention. The system 10' includes a conventional combustion turbine assembly, generally indicated as 11, having a main compressor 12 receiving, at inlet 13, a source of inlet air at ambient temperature and feeding a main fuel burning combustor 16 with the compressed air for preheating; a main expansion turbine 14 operatively associated with the main compressor 12, with the combustor 16 feeding the main expansion turbine 14, and an electric generator 15 for generating electric power.

For 5-25 MW compressed air energy storage plants, an air storage 18' is provided, preferably of the above ground type utilizing a pressure vessel and/or piping that stores air that is compressed by at least one auxiliary compressor 20. Intercoolers 19 can be associated with the compressor 20. In the embodiment, the auxiliary compressor 20 is driven by a motor 21, but can be driven by an expander or any other source. The auxiliary compressor 20 supplies the storage 18' with compressed air during off-peak hours. In accordance with the embodiment, a source of humidity is associated with an outlet 22 of the air storage 18'. As shown in FIG. 2, the source of humidity is a saturator 23 that is constructed and arranged to receive compressed air from the air storage 18' and to humidify the received compressed air with hot water. A conventional water heater 25 and pump(s) 27 are associated with the saturator 23. A heat exchanger 24 is constructed and arranged to receive a source of heat (e.g. exhaust air 29 from the main expansion turbine 14) and to receive humidified compressed air from the saturator 23 so as to heat the humidified compressed air received. Instead, or in addition to the exhaust air 29 from the main turbine 14, the heat exchanger 24 can receive any externally available source of heat.

An outlet 26 of the heat exchanger 24 is connected to an optional combustor 28, the function of which will be explained below, that feeds an expander 30. The expander 30 is preferably connected to a generator 30 for generating additional electric power produced by the expander 30. The heat exchanger 24, heating the compressed air sent to the expander 30, is also optional.

In a main power production mode of operation during peak hours and with the combustor 28 not operating, compressed air from the air storage 18' is supplied through the saturator 23 to be humidified, preheated in the heat exchanger 24, and sent to the expander 30. The humidified, heated air is expanded through the expander 30 that is connected to the electric generator 31 and produces additional power. The airflow extracted from the expander 30 is injected into the combustion turbine assembly 11, preferably upstream of combustors 16 with injection flow parameters determined by combustion turbine limitations and optimization. As shown in FIG. 2, structure 32 communicates with structure 33 to facilitate the injection of air. In the embodiment, the structures 32 and 33 are preferably piping structures. Injection can be limited or restricted under certain conditions. For example, based on combustion turbine manufacturers published data, injection at low ambient temperatures may not be permitted or possible, or injection may not be permitted or possible due to accessibility to injection points, or injection may not occur due to operational judgments. The extracted airflow injected into the combustion turbine assembly 11 upstream of the combustors 16 provides a combustion turbine power augmentation of approximately up to 20-25%. The remaining airflow in the expander 30 is expanded though low pressure stages to atmospheric pressure. Thus, when injection is possible or desired, not all airflow from the expander 30 is exhausted to atmospheric pressure.

Alternatively, in the main power production mode of operation during peak hours with the combustor 28 not operating, since the expander 30 reduces the pressure of the preheated humidified compressed air, the temperature of the compressed air is reduced. Thus, cold (lower than ambient temperature) air from the expander 30 can be connected via structure 32' with the ambient air at inlet 13 so that ambient inlet air and the colder expander exhaust air are mixed, reducing the overall temperature of the inlet air prior to being received by the main compressor 12. The reduction of the overall temperature of the inlet air prior to being received by the main compressor 12 provides a combustion turbine power augmentation of approximately up to 20-25%. In the embodiment, the structure 32' is piping connected between an exhaust stage of the expander 30 and the inlet 13 to the main compressor 12, which is an alternative to piping 32.

Due to the compressed air being humidified via the saturator, the flow rate from the air storage 18' is reduced to 28 lbs/s as compared to 47.5 lbs/s of FIG. 1, which does not employ the saturator 23. Since the flow rate from the air storage 18' is reduced while substantially maintaining the net total power (e.g., 15 MW of FIG. 2 and 15.3 MW of FIG. 1), the volume of the air storage 18' can advantageously be reduced, thereby lowering the cost thereof. In the embodiment of FIG. 2, the volume of the air storage 18' can be reduced by a factor of about 1.7 to provide the same specified stored/generated energy as compared to the volume of the air storage 18 of FIG. 1. Furthermore, since less air is needed to supply the air storage 18' the size and thus cost of the compressor 20 can be reduced with associated reduction of the compressor 20 power consumption.

In a synchronous reserve power mode of operation, which is an emergency mode of operation with very short duration, the combustor 28 is operating and the combustion turbine assembly 11 is not operating. The heat exchanger 24 and saturator 23 can be inoperable as well. Compressed air from the storage 18' is preheated by the combustor 28 for burning fuel that feeds the expander 30. The headed air is expanded through the expander 30 that is connected to the generator 31 for producing substantially immediate start-up for synchronous reserve power operation, independent of the operation of the combustion turbine assembly 11.

Figure 3:
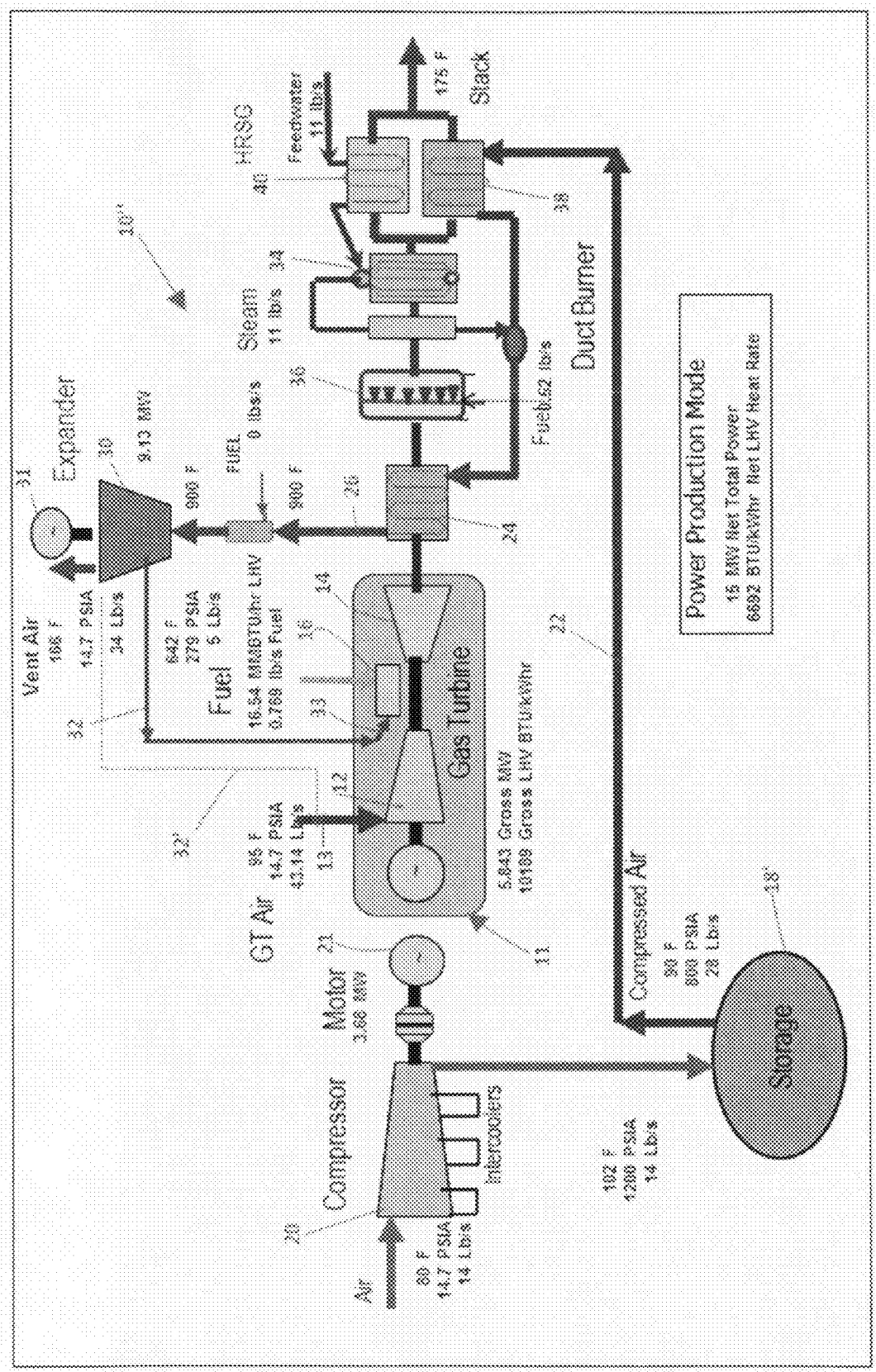
FIG. 3 is a schematic illustration of a CAES power generation system having a heat recovery steam generator as a source of humidity in accordance with another embodiment, so that due to use of humidified compressed air, a volume of the air storage and the size of the compressor for charging the air storage can be reduced.

With reference to FIG. 3, in the system 10", instead of the saturator 23, the source of humidity is a heat recovery steam generator (HRSG) 34. Thus, compressed air from the air storage 18' is mixed with steam, generated by the HRSG 34, prior to being further preheated by the heat exchanger 24 and expanded by the expander 30. The HRSG 34 preferably utilizes the exhaust from the turbine 14 as the source of heat. A duct burner 36 can be provided either upstream of heat exchanger 24 or between the heat exchanger 24 and HRSG 34, economizer 40 and air preheater 38. Due to the compressed air being humidified via the HRSG 34, the flow rate from the air storage 18' is reduced to 28 lbs/s as compared to 47.5 lbs/s of FIG. 1, which does not employ the HRSG 34. Since the flow rate from the air storage 18' is reduced while substantially maintaining the net total power (e.g., 15 MW of FIG. 3 and 15.3 MW of FIG. 1), the volume of the air storage to provide the same specified stored/generated energy can advantageously be reduced, thereby lowering the cost thereof.

Figure 4:
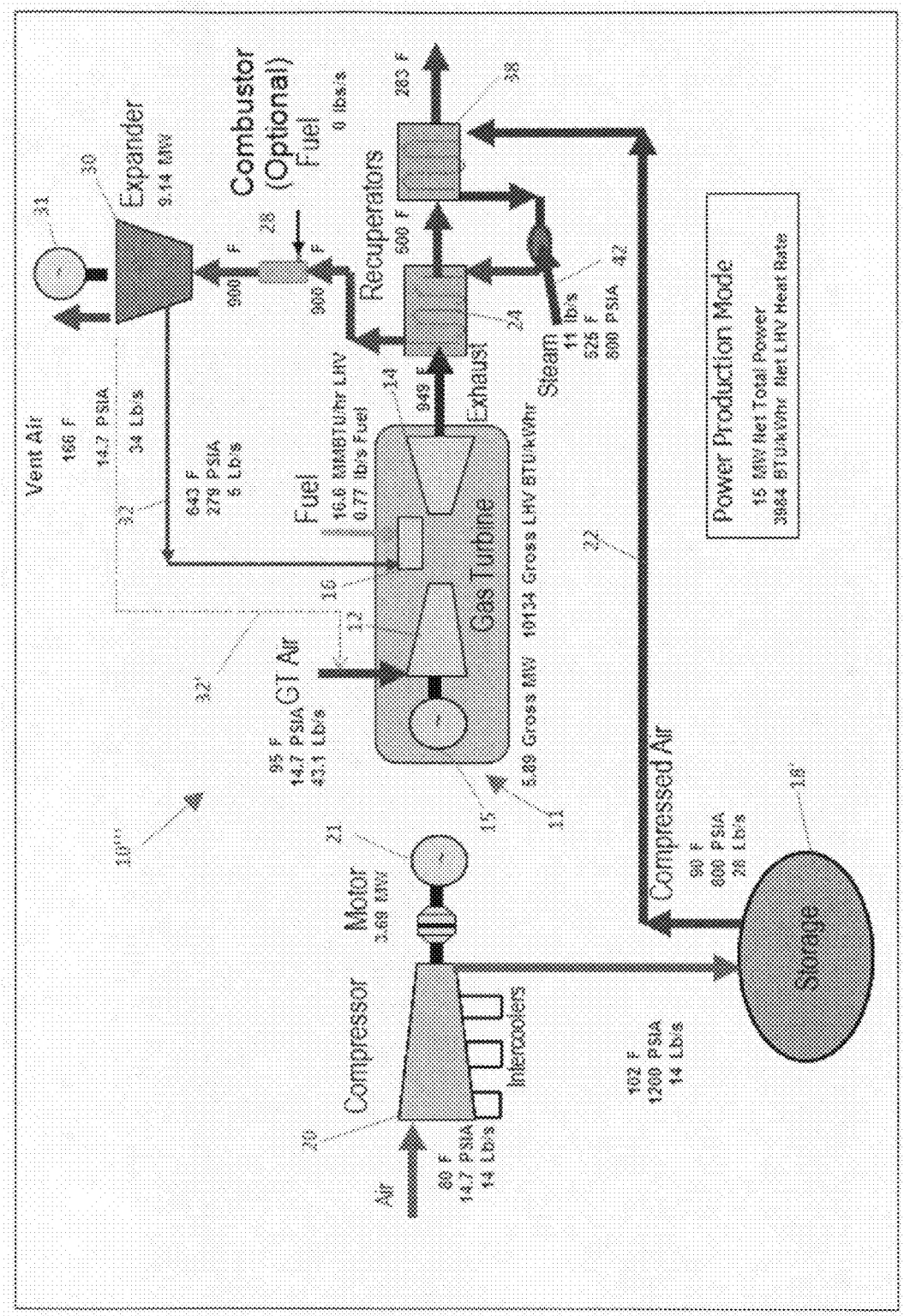
FIG. 4 is a schematic illustration of a CAES power generation system having a steam, external from the system, as a source of humidity in accordance with yet another embodiment of the invention, so that due to use of humidified compressed air, a volume of the air storage and the size of the compressor for charging the air storage can be reduced.

With reference to FIG. 4, in the system 10''', instead of the HRSG 34, the source of humidity is steam 38 produced externally from the system 10'''. Due to the compressed air being humidified via the added steam 38, the flow rate from the air storage 18' is reduced to 28 lbs/s as compared to 47.5 lbs/s of FIG. 1, which does not employ the additional steam 38. Since the flow rate from the air storage 18' is reduced while substantially maintaining the net total power (e.g., 15 MW of FIG. 4 and 15.3 MW of FIG. 1), the volume of the air storage to provide the same specified stored/generated energy can advantageously be reduced, thereby lowering the cost thereof.

Thus, the systems of embodiments humidify the stored compressed air before being directed to the expander 30 for additional power generation. The humidification of the compressed air significantly increases the humidified compressed airflow mass by factor of about 1.5 to 2.5 (depending on the humidification temperature and pressure) and significantly increases the power of the expander 30. The humidified compressed air flow and temperature thereof introduced to the expander 30 is optimized based on the available exhaust heat of combustion turbine assembly 11 and/or other heat source. While producing substantially the same power via the expander 30 (as compared to the system 10 of FIG. 1), the use of the humidified compressed air flow by the expander 30 significantly reduces the stored "dry" compressed airflow mass by a factor of about 1.5 to 2.5, with corresponding reduction of the volume of the compressed air storage and cost thereof. Thus, for the small CAES systems of FIGS. 2, 3 and 4 that provide practically the same net total power of about 15 MW and the same stored/generated energy, the cost an above ground storage 18' is now significantly reduced and feasible.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method of reducing a volume of an air storage of a compressed air energy storage (CAES) power generation system having a combustion turbine assembly including a main compressor constructed and arranged to receive ambient inlet air, a main expansion turbine operatively associated with the main compressor, at least one combustor constructed and arranged to receive and preheat compressed air from the main compressor and to feed the main expansion turbine, and an electric generator associated with the main expansion turbine for generating electric power, the method including:
    releasing compressed air from an air storage,
    humidifying the compressed air released from the air storage,
    heating the humidified compressed air using exhaust heat from the combustion turbine assembly,
    expanding the heated, humidified compressed air in an air expander that is separate from the combustion turbine assembly, the air expander being constructed and arranged to permit a portion of airflow expanded by the air expander to be extracted and injected, under certain conditions, into the combustion turbine assembly for power augmentation, and
    generating, via an electric generator that is separate from the generator of the combustion turbine assembly, additional electric power using air expanded through the air expander,
    wherein humidifying the compressed air enables a volume of compressed air stored in the air storage to be reduced as compared to a volume thereof absent the humidifying step.

2. The method of claim 1, wherein the system is constructed and arranged to provide a net total power of about 5-25 MW and the method includes using a pressure vessel or piping as the compressed air storage.

3. The method of claim 1, wherein a saturator humidifies the compressed air.

4. The method of claim 1, wherein a heat recovery steam generator humidifies the compressed air.

5. The method of claim 1, wherein steam from a source external from the system humidifies the compressed air.

6. The method of claim 1, wherein the step of humidifying ensures that a volume of the air storage can be reduced by a factor of about 1.5 to 2.5 as compared to a volume of an air storage in a second system that does not humidify the compressed air released, when the system and the second system produce substantially the same net total power and have the same stored/generated energy.

7. The method of claim 1, wherein the heating step includes using exhaust air from the main expansion turbine as a source of heat.

8. The method of claim 1, wherein the portion of the airflow is injected upstream of the main combustor.

9. The method of claim 1, wherein all or the portion of the airflow is mixed with inlet air of the main compressor.

* * * * *